J. M. WATSON
PLANT PROTECTOR.

No. 79,422.

Patented June 30, 1868.

Witnesses:

Inventor:
J. M. Watson.
by his attorney

United States Patent Office.

JEREMIAH M. WATSON, OF SHARON, MASSACHUSETTS, ASSIGNOR TO HIMSELF AND WILLIAM B. WICKES, OF SAME PLACE.

*Letters Patent No. 79,422, dated June 30, 1868.*

IMPROVEMENT IN PLANT-PROTECTORS.

*The Schedule referred to in these Letters Patent and making part of the same.*

TO ALL PERSONS TO WHOM THESE PRESENTS MAY COME:

Be it known that I, JEREMIAH M. WATSON, of Sharon, in the county of Norfolk, and State of Massachusetts, have invented a new and useful Plant-Protector; and do hereby declare the same to be fully described in the following specification, and represented in the accompanying drawings, of which—

Figure 1:
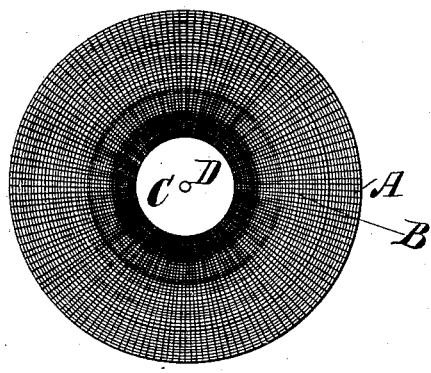
Figure 2:
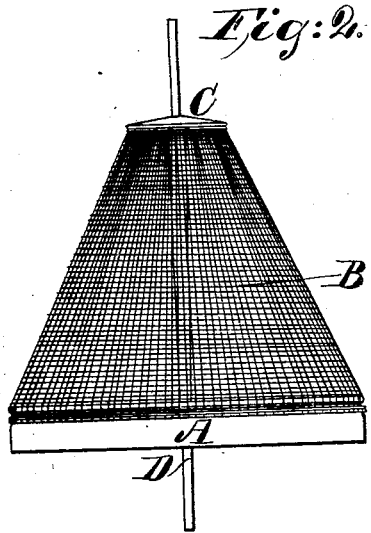

Figure 1 is a top view,

Figure 2 a front elevation, and

Figure 3:
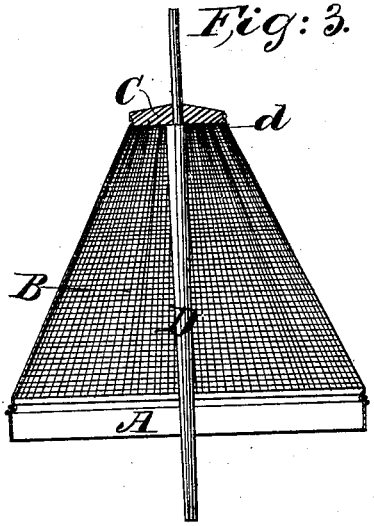

Figure 3 a vertical section of it.

The purpose of the invention is to protect a plant from worms or insects while such plant may be in the process of growing.

The base of the protector is a thin hoop, A, formed of sheet metal or other suitable material, which, when placed on the ground, may be easily forced edgewise down into the same. To and around the upper part of the hoop a hollow cylinder or frustum, of gauze or netting, B, is fixed, the upper part of such netting being screwed to and about the periphery of a disk, C. Through this disk a stake or pole, D, extends, it being provided with a shoulder, $a$, for the disk to rest upon. The stake projects both above and below the disk, and below the hoop, in manner as represented, although it is not essential that it should extend above the disk. The purpose of the stake is to support the disk or upper part of the netting at a proper height above the ground.

In arranging the protector over a plant or a quantity of seeds sown in the earth, the stake is to be driven into the ground close to the plant or seeds, and far enough to allow of the hoop being pressed nearly its depth into the earth, and about the seeds or plant. The protector serves to keep bugs, insects, birds, and worms from getting access to the seeds or plant, and eating or injuring the same.

I am aware of the plant-protector represented in "Instruments d'Agriculture et de Jardinage," plate 104, fig. 7, which consists simply of a wire cage, open at bottom, and having four feet or wires projecting from the corners of its bottom. I do not claim such plant-protector, as mine differs essentially from it; that is to say, mine has not only a central stake, to support the netting-disk, and operate as a handle thereto, but it has a thin and wide ring at its bottom, to enter the soil.

My plant-protector can be folded, so as to occupy a very small place, and may be fixed in place by its stake, and so as to prevent it from being overthrown by a bird when it may be in use.

From the foregoing, it will be perceived that the nature of my invention consists in the employment of a screen, of gauze, or other woven and pliable fabric of like character, in combination with a central stake, for stretching and upholding the screen, and for giving additional strength and stability to the whole device, and a ring or hoop, of metal or other suitable material, whose lower edge enters the earth, and holds the bottom of the fabric in place.

The stake D may also, as shown in the drawing, be so arranged as to be readily fitted in or withdrawn from a hole formed for its reception in the disk C. This facilitates the packing of the device, for, after removing the stake, the netting or gauze may be folded and packed within the ring A.

In any event, however, whether the stake be removable or not, it serves to steady and sustain the protector in position over the plants or seed to be protected, and stretches and upholds the gauze or other woven and pliable fabric of which the main portion of the protector is composed.

What I claim, therefore, as my invention, and desire to secure by Letters Patent, is—

A plant-protector, in which a screen, of gauze, netting, or equivalent woven and pliable fabric, is combined with the hoop or ring A and the supporting-stake D, in the manner and for the purposes shown and set forth.

JEREMIAH M. WATSON.

Witnesses:
 WM. B. WICKES,
 WM. R. MANN.